(12) United States Patent
Nilsson et al.

(10) Patent No.: US 10,574,321 B2
(45) Date of Patent: Feb. 25, 2020

(54) UE REPORTING AGGREGATED CHANNEL STATE INFORMATION BASED ON MULTIPLE P3 SWEEPS

(71) Applicant: TELEFONAKTIEBOLAGET LM ERICSSON (PUBL), Stockholm (SE)

(72) Inventors: Andreas Nilsson, Göteborg (SE); Fredrik Athley, Kullavik (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/812,199

(22) Filed: Nov. 14, 2017

(65) Prior Publication Data

US 2019/0149211 A1  May 16, 2019

(51) Int. Cl.
| | |
|---|---|
| *H04B 7/06* | (2006.01) |
| *H04B 7/0408* | (2017.01) |
| *H04L 25/02* | (2006.01) |
| *H04W 72/04* | (2009.01) |

(52) U.S. Cl.
CPC ......... *H04B 7/0626* (2013.01); *H04B 7/0408* (2013.01); *H04L 25/0224* (2013.01); *H04W 72/042* (2013.01); *H04W 72/046* (2013.01); *H04W 72/0413* (2013.01)

(58) Field of Classification Search
CPC .. H04B 7/0626; H04B 7/0617; H04B 7/0408; H04B 7/0619
USPC ................................. 375/219–220, 267, 299
See application file for complete search history.

(56) References Cited

U.S. PATENT DOCUMENTS

| | | | |
|---|---|---|---|
| 2017/0207828 A1* | 7/2017 | Jung ................... | H04B 7/0617 |
| 2018/0132217 A1* | 5/2018 | Stirling-Gallacher ...................... H04B 7/0417 |
| 2018/0205440 A1* | 7/2018 | Enescu ................ | H04B 7/0695 |
| 2018/0206244 A1* | 7/2018 | Yang ................... | H04W 72/085 |
| 2018/0227862 A1* | 8/2018 | Liu ........................ | H04W 52/42 |
| 2018/0302141 A1* | 10/2018 | Kutz .................... | H04B 7/0634 |
| 2018/0323926 A1* | 11/2018 | Cezanne .............. | H04B 7/0695 |

(Continued)

OTHER PUBLICATIONS

Tateishi, K., et al., "Indoor Experiment on 5G Radio Access Using Beam Tracking at 15 GHz Band", NTT Docomo, Inc.; 2016 IEEE 27th Annual International Symposium on Personal, Indoor, and Mobile Radio Communications (PIMRC): Workshop: Inclusive Radio Communication Networks for 5G and Beyond (IRACON2016), 6 pages.

(Continued)

*Primary Examiner* — Emmanuel Bayard
(74) *Attorney, Agent, or Firm* — Rothwell, Figg, Ernst & Manbeck, P.C.

(57) ABSTRACT

In one aspect, a base station (e.g., a TRP) transmits an indication of a joint P3 sweep to a wireless device which triggers the wireless device (e.g., a UE) to perform the joint P3 sweep. In another aspect, the wireless device performs the joint P3 sweep by obtaining measurements based on a first set and second set of one or more one-port or two-port channel state information reference signal (CSI-RS) transmissions from the TRP. The wireless device determines the aggregated channel estimation based on the obtained measurements. The wireless device determines at least one or more of a precoding matrix indicator (PMI), a modulation and coding scheme (MCS), and a rank based on the determined aggregated channel estimation and reports the determined at least one or more PMI, MCS, and rank in one channel state information (CSI) report.

24 Claims, 13 Drawing Sheets

(56) References Cited

U.S. PATENT DOCUMENTS

| | | | | |
|---|---|---|---|---|
| 2018/0331805 A1* | 11/2018 | Xia | ........................ | H04L 5/0051 |
| 2018/0343046 A1* | 11/2018 | Park | ...................... | H04B 7/0626 |
| 2018/0343595 A1* | 11/2018 | da Silva | ............ | H04W 36/0077 |
| 2018/0368142 A1* | 12/2018 | Liou | ................. | H04W 72/0446 |
| 2018/0376351 A1* | 12/2018 | Nagaraja | ............... | H04W 24/02 |
| 2019/0053072 A1* | 2/2019 | Kundargi | .............. | H04B 7/0814 |
| 2019/0058561 A1* | 2/2019 | Ho | ........................ | H04B 7/0695 |
| 2019/0089443 A1* | 3/2019 | Malik | .................. | H04B 7/0404 |

OTHER PUBLICATIONS

International Search Report and Written Opinion issued in International Application No. PCT/EP2017/080228, dated Jul. 17, 2018, 19 pages.
3GPP TSG-RAN WG1 #90, R1-1716396; Nagoya, P.R. Japan, Sep. 18-21, 2017; Qualcomm, "Beam management for NR" (6 pages).
3GPP TSG RAN WG1 #90, R1-1713757; Prague, Czech Republic, Aug. 21-25, 2017; Huawei, HiSilicon, "Beam reporting for beam management" (11 pages).

\* cited by examiner

UE REPORTING AGGREGATED CHANNEL STATE INFORMATION BASED ON MULTIPLE P3 SWEEPS

TECHNICAL FIELD

Disclosed are embodiments related to a UE reporting aggregated channel state information based on multiple P3 sweeps.

BACKGROUND

The Third Generation Partnership Project (3GPP) has begun on work on the development and design of the next generation mobile communications system (a.k.a., as the 5G mobile communication system or simply "5G" for short). 5G will encompass an evolution of today's 4G networks and the addition of a new, globally standardized radio access technology known as "New Radio" (NR).

The large variety of requirements for NR implies that frequency bands at many different carrier frequencies will be needed. For example, low bands will be needed to achieve sufficient coverage and higher bands (e.g. mmW, such as near and above 30 GHz) will be needed to reach the required capacity. At high frequencies the propagation properties are more challenging and high order beamforming at the base station (e.g., eNB or gNB) will be required to reach sufficient link budget. For example, narrow beam transmission and reception schemes may be needed at higher frequencies to compensate the high propagation loss. For a given communication link, a beam can be applied at the transmission point, TRP, (i.e., a transmit (TX) beam) and a beam can be applied at the user equipment (UE) (i.e., a receive (RX) beam)), which collectively is referred to as a "beam pair link" (BPL) or just "link" for short.

Beamforming implies transmitting the same signal from multiple antenna elements of an antenna array with an amplitude and/or phase shift applied to the signal for each antenna elements. These amplitude/phase shifts are commonly denoted as the antenna weights and the collection of the antenna weights for each of the antennas is a precoding vector. Such antenna weights and precoding vectors are examples of a transmit spatial filtering configuration.

Different transmit spatial filtering configurations (e.g., different precoding vectors) give rise to a beamforming of the transmitted signal and the weights can be controlled so that the signals are coherently combining in a certain angle direction as seen from the antenna array in which case it is said that a transmit (TX) beam is formed in that direction. Hence, in some contexts, when we refer to a TX beam we are referring to a particular transmit spatial filtering configuration (a.k.a., "beamforming weights" or "beam parameters"), and when we refer to an RX beam we are referring to a particular receive spatial filtering configuration. If the antennas of the array are placed in two dimensions, i.e. in a plane, then the beam can be steered in both azimuth and elevation directions with respect to the plane perpendicular to the antenna array.

Beamforming generally requires some form of beam management, such as beam search, beam refinement, and/or beam tracking, to determine what UL and/or DL transmit (TX) and receive (RX) beams to use for communication between two units. Typically, the two units are 1) an access network node (ANN) (a.k.a., transmission and reception point (TRP)), such as, for example, a 5G base station (gNB) or other base station, and 2) a user equipment (UE) (i.e., a stationary or mobile wireless communication device (WCD), such as, for example, a smartphone, a tablet, a sensor, a smart appliance (or other Internet-of-Things (IoT) device), etc., that is capable of wireless communication with a TRP).

A beam management procedure refers to discovering and maintaining a beam pair link. An example of the beam management procedure is shown in FIG. 1. In FIG. 1, there is shown a BPL between a TRP 105 (e.g., a base station) and a UE 110 (e.g., wireless device). The BPL comprises a transmit (TX) beam 115 and a corresponding receiving (RX) beam 120. In some embodiments, the BPL may be established and monitored by using measurements on downlink reference signals used for beam management. In New Radio (NR), 3GPP has agreed to use channel state information reference signals (CSI-RS) as the reference signals for beam management. The CSI-RS for beam management may be transmitted by the TRP 105 periodically, semi-persistently or aperiodically (event triggered). Such CSI-RS may be shared between multiple UEs or the CSI-RS may be UE-specific.

As shown in FIG. 1, in order to find a suitable downlink (DL) TX beam, e.g., the TX beam 115, the TRP transmits CSI-RS in different TX beams 115, 125, 130 on which the UE 110 performs reference signal receive power (RSRP) measurements and reports back a number, N, of the best TX beams. The number N of the best TX beams may be configured by the network. The TRP 105 may determine a suitable TX beam (e.g., the TX beam 115 in the example shown in FIG. 1) for the UE 110 based on the reports. This process of the TRP 105 determining the suitable TX beam may be referred to as a TX beam management procedure or as a P2 sweep. The TRP 105 can then repeatedly transmit the CSI-RS on the determined TX beam 115 to allow the UE 110 to evaluate different RX beams to find a suitable RX beam (e.g. RX beam 120). The UE 110 may evaluate the different RX beams by performing CSI-RS measurements of the CSI-RS transmissions. This evaluation may be referred to as a P3 sweep (a.k.a. RX beam training procedure). The suitable RX beam that the UE 110 chooses as a result of the P3 sweep will be agnostic to the TRP 105 in NR. Hence, there is no need for the UE 110 to signal back to the TRP 105 which RX beam it chooses. However, in order to quickly transition from beam management to data transmission, 3GPP has agreed that the UE 110 can be configured to report CSI in relation to the P3 sweep. The channel state information (CSI) report may contain precoding matrix indicator (PMI), rank, and modulation and coding scheme (MCS) for the CSI-RS resource corresponding to the UE-selected RX beam. Referring back to FIG. 1, the UE 110 may transmit, to the TRP 105, a CSI report containing the PMI, rank, and MCS for the CSI-RS resource corresponding to the RX beam 120.

There are basically three different implementations of beamforming, both at the TRP and at the UE: (1) analog beamforming, (2) digital beamforming, and (3) hybrid beamforming. Digital beamforming is the most flexible solution, but also the costliest due to the large number of required radios and baseband chains. Analog beamforming is the least flexible, but cheaper to manufacture due to reduced number of radio and baseband chains. Hybrid beamforming is a compromise between the analog and digital beamforming. 3GPP has agreed to study the concept of antenna panels as one example of analog/hybrid beamforming antenna architecture for NR access technology in 5G. An antenna panel is a rectangular antenna array of dual-polarized elements with typically one transmit/receive unit (TXRU) per polarization. An analog distribution network with phase shifters is used to steer the beam of each panel. Multiple panels can be stacked next to each other and digital beamforming can be performed across the panels. FIGS. 2-3 illustrate antenna panels 202A-B, 302A-B according to the exemplary analog/hybrid beamforming antenna architecture. FIG. 2 shows a first panel 202A and a second panel 202B where each panel comprises a two-dimensional antenna array of dual-polarized elements and is connected to one transceiver unit (TXRU) 204A-D per polarization. FIG. 3 shows a first panel 302A and a second panel 302B where each panel comprises a one-dimensional antenna array of dual-polarized elements and is connected to one TXRU 304A-D per polarization.

In LTE, reference signals (RSs) used for channel estimation are equivalently denoted as antenna ports. Hence a UE can estimate the channel from one antenna port by using the associated RS. One could then associate a certain data or control transmission with an antenna port, which is equivalent to say that the UE shall use the RS for that antenna port to estimate the channel used for data transmission.

In NR, 3GPP has agreed that CSI-RS resources used for beam management can consist of one or two CSI-RS ports. If the TRP has a dual-polarized antenna panel (e.g., a panel as illustrated in FIGS. 2-3), one possible working assumption in NR for beam management is to configure each set of CSI-RS resources with two ports, one port per polarization, i.e. each TX beam is transmitted by the TRP over two polarizations. In this case the UE can measure an average RSRP over both polarizations for each port and report the best TX beam(s) back to the TRP.

In NR, it is expected that the UE will use two or more antenna panels, preferably pointing in different directions, in order to improve the coverage and increase the order of spatial multiplexing. One example of such implementation is illustrated in FIG. 4, where two one-dimensional panels 404A-B are located in different directions at a UE 402. The antenna elements of the two panels 404A-B may be either dual-polarized or single-polarized.

In some scenarios, both the TRP and the UE may have at least two dual-polarized antenna panels each. Accordingly, both the TRP and the UE may have at least four baseband chains and up to four-layer transmissions may be possible between them. Four layer transmissions may be common for 5G, even in cases such as line-of-sight scenarios.

SUMMARY

In such scenarios where the TRP and the UE each have two dual polarized antenna panels, one suitable TX beam may be found for each of the antenna panels for the UE. For example, a first and second TX beam may be found for a first and second dual polarized antenna panel for the UE, respectively, based on a TRP TX beam management procedure. Accordingly, there may be four CSI-RS ports between the TRP and the UE. As a next step, the TRP may initiate one or more P3 sweeps, in order to optimize the performance between the four CSI-RS ports between the TRP and the UE. That is, the TRP may initiate one or more P3 sweeps for the two suitable TX beams. However, the current beam management procedures, as agreed by 3GPP, only allow the use of a maximum of two CSI-RS ports for each P3 sweep. Hence, the TRP initiates two separate P3 sweeps by the UE, one P3 sweep per TRP antenna panel. Based on the current beam managements procedures, the UE will determine two different RX beams based on the two respective P3 sweeps and correspondingly signal back two CSI reports, one CSI reports per P3 sweep. Accordingly, the current methods for optimizing performance between the four CSI-RS ports between the TRP and the UE require the UE to perform two separate P3 sweeps and report two corresponding CSI reports, which is sub-optimal.

According to some of the disclosed embodiments, the TRP may indicate to the UE that multiple P3 sweeps should correspond to one data transmission, such that the UE finds one common UE RX beam setting for all P3 sweeps, and that the UE signals one CSI report containing the aggregation of TRP ports corresponding to all UE RX beam training procedures. For example, there may be two P3 sweeps, both sweeps using multiple two-port CSI-RS resources. According to some of the disclosed embodiments, the TRP may trigger a UE to perform a joint P3 sweep corresponding to four CSI-RS ports. After performing the joint P3 sweep, the UE may transmit, to the TRP, one CSI report corresponding to four CSI-RS ports. In such an embodiment, the CSI report may comprise a PMI corresponding to a four-port codebook and rank varying between one and four, among others.

In another aspect there is a method performed by a TRP. The method includes transmitting an indication of a joint P3 sweep to a UE, wherein the indication triggers the UE to perform the joint P3 sweep.

In some embodiments, the indication may be a downlink control information (DCI) message comprising a first index to a first channel state information reference signal (CSI-RS) resource set and a second index to a second CSI-RS resource set. In such embodiments, the first CSI-RS resource set relates to a first P3 sweep and the second CSI-RS resource set relates to a second P3 sweep. Each of the first and second CSI-RS resource set may comprise information identifying one or more CSI-RS resources and a repetition indicator. In some embodiments, the repetition indicator may be a repetition flag configured to be set "on" or "off." In some embodiments, the DCI message may further comprise a report index to a CSI-RS report setting. The CSI-RS report setting may be configured to instruct the UE what to report regarding the joint P3 sweep. In some embodiments, the CSI-RS report setting may instruct the UE to report channel state information (CSI) and reference signal received power (RSRP) beam report, among others.

In some embodiments, the indication may be a downlink control information (DCI) message comprising an index to a channel state information reference signal (CSI-RS) resource set. In such embodiments, the CSI-RS resource set comprises a first CSI-RS resource group which relates to a first P3 sweep and a second CSI-RS resource group which relates to a second P3 sweep. In some embodiments, each of the first and second CSI-RS resource group may comprise information identifying one or more CSI-RS resources and a repetition indicator. In some embodiments, the CSI-RS resource set may comprise one repetition indicator for the first and second CSI-RS resource group, where each of the first and second CSI-RS resource group comprises information identifying one or more CSI-RS resources. In some embodiments, the repetition indicator may be a repetition flag configured to be set "on" or "off."

In some embodiments, the indication may be a first downlink control information (DCI) message relating to a first P3 sweep and a second DCI message relating to a second P3 sweep. In such embodiments, the first DCI message comprises a first index to a first channel state information reference signal (CSI-RS) resource set and a report index to a CSI-RS report setting. The second DCI message comprises a second index to a second CSI-RS resource set and the report index to the CSI-RS report setting. In some embodiments, each of the first and second CSI-RS resource set may comprise information identifying one or more CSI-RS resources and a repetition indicator. In some embodiments, the repetition indicator may be a repetition flag configured to be set "on" or "off."

In another aspect, there is method performed by a UE. The method includes: (1) performing a joint P3 sweep, which comprises obtaining first measurements based on a first set of one or more one-port or two-port channel state information reference signal (CSI-RS) transmissions, and obtaining second measurements based on a second set of one or more one-port or two-port CSI-RS transmissions; and (2) determines an aggregated channel estimation based on the first and second measurements. In some embodiments, the UE receives a trigger to perform the joint P3 sweep. In some embodiments, the aggregated channel estimation is a four-port channel estimation.

In some embodiments, the method further includes determining at least one or more of a precoding matrix indicator (PMI), a modulation and coding scheme (MCS), and a rank based on the determined aggregated channel estimation. In some embodiments, the method may also include reporting the determined at least one or more of the PMI, the MCS, and the rank to a TRP (e.g., base station). In some embodiments, the determined at least one or more of the PMI, the MCS, and the rank is reported to the TRP in one channel state information (CSI) report.

In another aspect, there is a method performed by a UE. The method includes receiving an indication of a joint P3 sweep transmitted by a TRP (e.g., base station), wherein the indication triggers the wireless device to perform the joint P3 sweep.

In some embodiments, the indication may be a downlink control information (DCI) message comprising a first index to a first channel state information reference signal (CSI-RS) resource set and a second index to a second CSI-RS resource set. In such embodiments, the first CSI-RS resource set relates to a first P3 sweep and the second CSI-RS resource set relates to a second P3 sweep. Each of the first and second CSI-RS resource set may comprise information identifying one or more CSI-RS resources and a repetition indicator. In some embodiments, the repetition indicator may be a repetition flag configured to be set "on" or "off." In some embodiments, the DCI message may further comprise a report index to a CSI-RS report setting.

In some embodiments, the indication may be a downlink control information (DCI) message comprising an index to a channel state information reference signal (CSI-RS) resource set. In such embodiments, the CSI-RS resource set comprises a first CSI-RS resource group which relates to a first P3 sweep and a second CSI-RS resource group which relates to a second P3 sweep. In some embodiments, each of the first and second CSI-RS resource group may comprise information identifying one or more CSI-RS resources and a repetition indicator. In some embodiments, the CSI-RS resource set may comprise one repetition indicator for the first and second CSI-RS resource group, where each of the first and second CSI-RS resource group comprises information identifying one or more CSI-RS resources. In some embodiments, the repetition indicator may be a repetition flag configured to be set "on" or "off."

In some embodiments, the indication may be a first downlink control information (DCI) message relating to a first P3 sweep and a second DCI message relating to a second P3 sweep. In such embodiments, the first DCI message comprises a first index to a first channel state information reference signal (CSI-RS) resource set and a report index to a CSI-RS report setting. The second DCI message comprises a second index to a second CSI-RS resource set and the report index to the CSI-RS report setting. In some embodiments, each of the first and second CSI-RS resource set may comprise information identifying one or more CSI-RS resources and a repetition indicator. In some embodiments, the repetition indicator may be a repetition flag configured to be set "on" or "off."

One advantage of the embodiments is that the joint P3 sweep and corresponding CSI-report can be performed for more than two TRP ports, which will enable higher layer spatial multiplexing with correct CSI-feedback directly after the performed joint P3 sweep.

In some embodiments, the TRP may indicate to the UE that multiple P3 sweeps may correspond to one data transmission, such that the UE finds one common UE RX beam setting for all the P3 sweeps, and that the UE signals one CSI report containing the aggregation of TRP ports corresponding to all the P3 sweeps.

BRIEF DESCRIPTION OF THE DRAWINGS

The accompanying drawings, which are incorporated herein and form part of the specification, illustrate various embodiments.

DETAILED DESCRIPTION

As used herein the indefinite articles "a" and "an" mean at least one.

Figure 1:
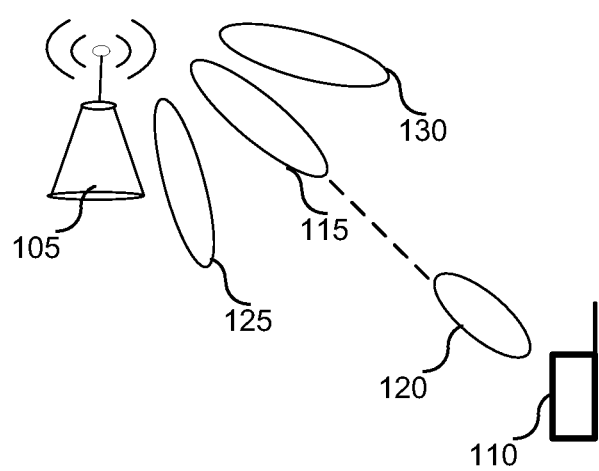
FIG. 1 illustrates an example of a TRP and UE using beam pair link (BPL).
Figure 2:
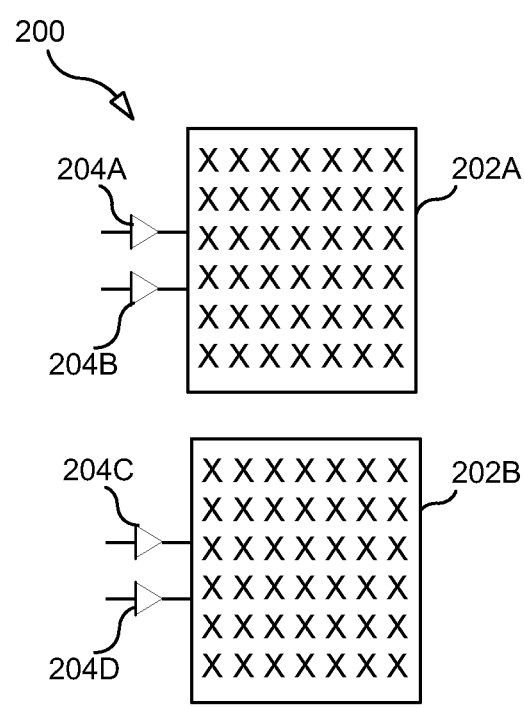
FIG. 2 illustrates exemplary antenna panels.
Figure 3:
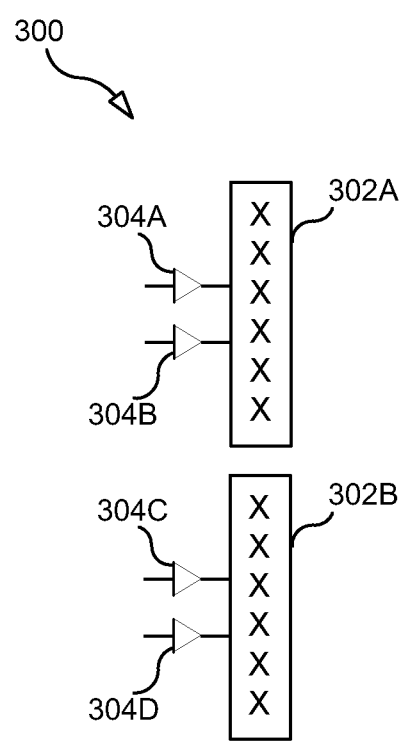
FIG. 3 illustrates exemplary antenna panels.
Figure 4:
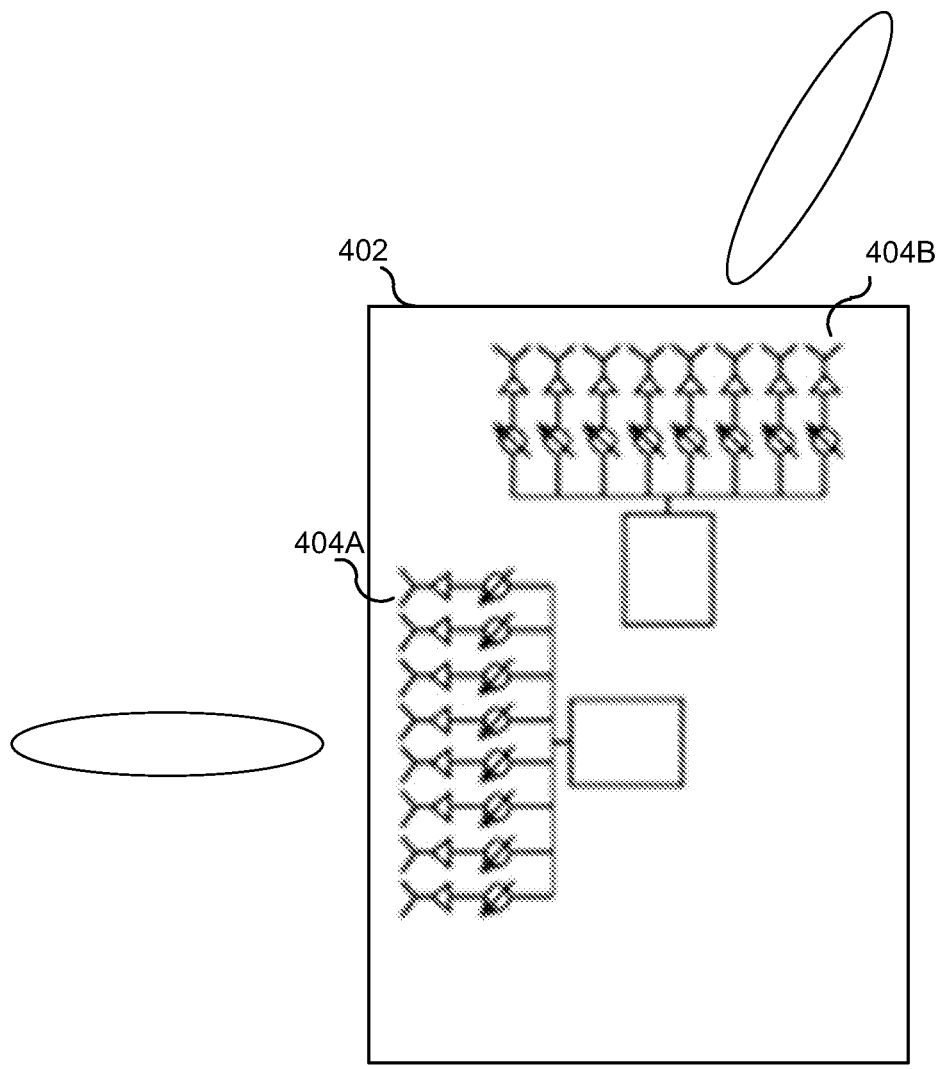
FIG. 4 illustrates an exemplary UE with two antenna panels.
Figure 5:
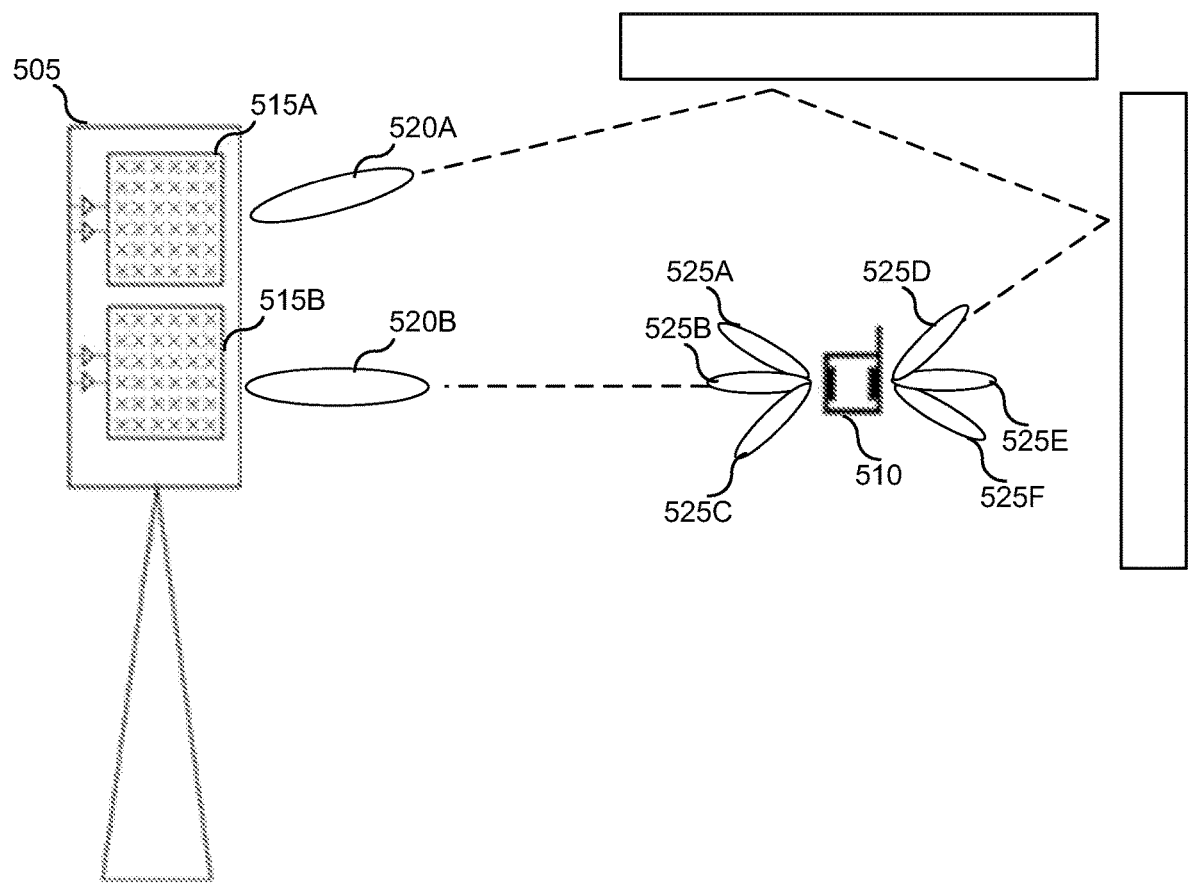
FIG. 5 illustrates a TRP and a UE beam forming according to one embodiment.

FIG. 5 illustrates a TRP 505 and a UE 510 beam forming according to one embodiment. As shown in FIG. 5, a TRP 505 may comprise a first antenna panel 515A and a second antenna panel 515B. Each of the first and second antenna panel 515A-B may comprise a two-dimensional array of dual-polarized antenna elements. The TRP 505 may have determined a first suitable TX beam 520A for the first antenna panel 515A and a second suitable TX beam 520B for the second antenna panel 515B based on, for example, an earlier TRP TX beam management procedure. In the next step, the TRP 505 may initiate the UE 510 to find suitable UE RX beams for the first and second TX beams 520A-B. In some embodiments, the suitable UE RX beams may be any two of the RX beams 525A-F shown in FIG. 5. Accordingly, the TRP 505 may initialize a CSI-RS measurement (e.g., P3 sweep) for the UE 510 per panel 515A-B by transmitting a burst of two port CSI-RSs from the panels 515A-B through the respective TX beams 520A-B. The TRP 505 transmits an indication to the UE 510 that the two CSI-RS measurements should be treated as one aggregated CSI-RS measurement (i.e. the TRP 505 triggering a "joint P3 sweep"). The indication for the joint P3 sweep may be made implicitly or explicitly by the TRP 505 to the UE 510.

Upon receipt of the indication for the joint P3 sweep, the UE 510 performs the joint P3 sweep, in which the UE 510 considers each transmission of the two two-port CSI-RS resources (one two-port CSI-RS resource per antenna panel 515A-B) as one aggregated four-port CSI-RS resource. The number of antenna panels and the polarization of each panel at the UE 510 may vary according to some embodiments. For example, the UE 510 may comprise two dual-polarized antenna panels. In another example, the UE 510 may comprise four single-polarized antenna panels. That is, any number of panels with any number of ports is contemplated. In some embodiments, the UE 510 may perform the joint P3 sweep by obtaining a first measurement of the two port CSI-RSs from the first antenna panel 515A and a second measurement of the two port CSI-RSs from the second antenna panel 515B. The UE 510 then evaluates the different UE RX beam settings based on the aggregated four-port CSI-RS resource. In some embodiments, the UE 510 may determine an aggregated channel estimation based on the first and second obtained measurements of the two port CSI-RSs from the panels 515A-B. For example, the UE 510 may evaluate the different UE RX beam settings based on a highest estimated throughput over all four aggregated CSI-RS ports. The UE 510 will then determine a UE RX beam setting based on the aggregated four-port CSI-RS, for example, determining the UE RX beam setting that gives the highest estimated throughput. In some embodiments, the UE 510 may transmit, to the TRP 505, a CSI-report containing the PMI, rank, and MCS corresponding to the aggregated ports of the aggregated CSI-RS measurement. In some embodiments, the UE 510 may use a four-port codebook to determine at least one or more of the PMI, the rank, the MCS, among others.

Figure 6:
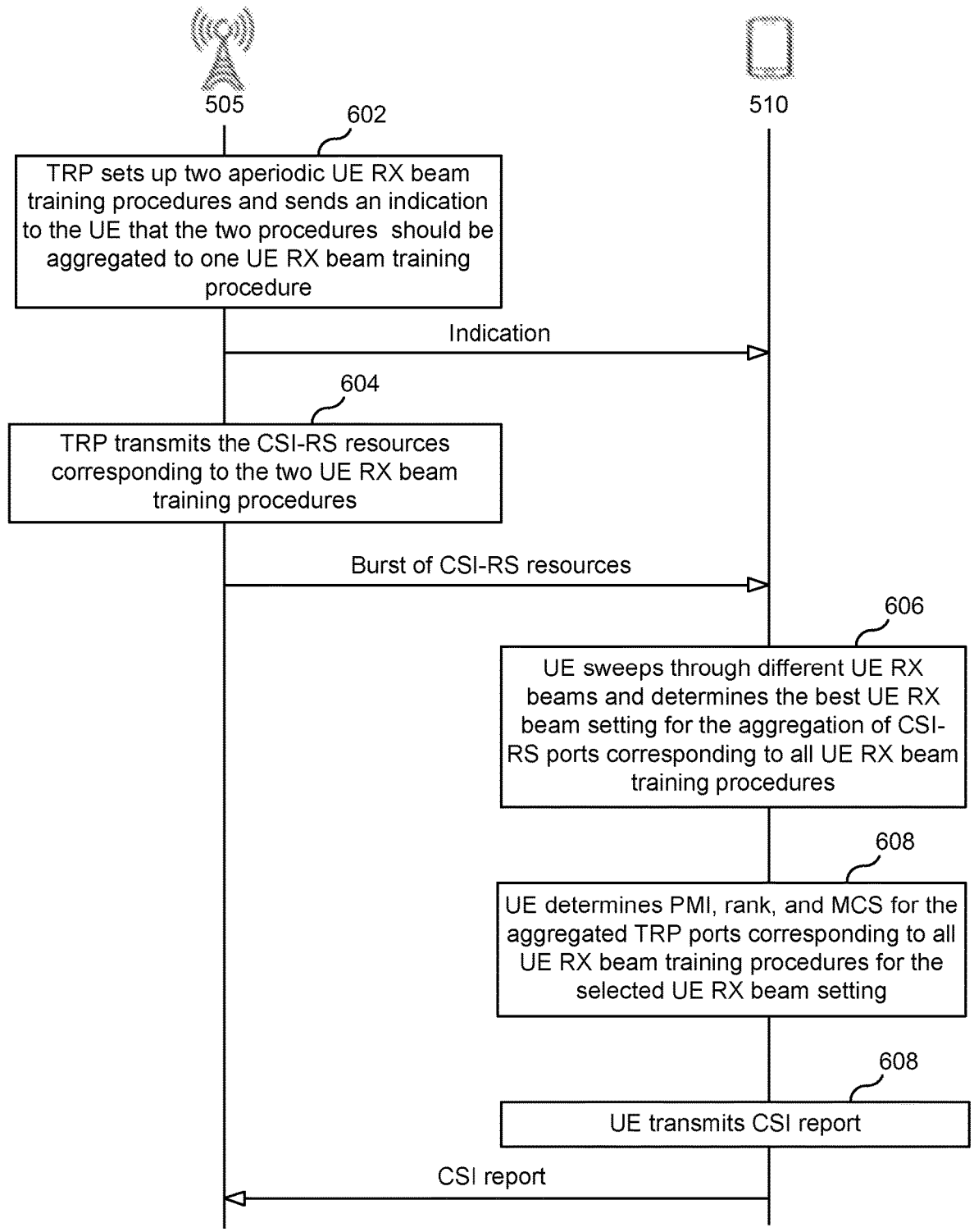
FIG. 6 illustrates a flow chart illustrating a process according to one embodiment.

FIG. 6 shows a flow chart illustrating a process according to one embodiment. As shown in FIG. 6, the TRP 505 may have determined a first and second suitable TX beam for a first and second antenna panel, respectively, based on an earlier TRP TX beam management procedure. In some embodiments, the UE 510 may use wide UE RX beams in the earlier TRP TX beam management procedures. FIG. 6 shows an exemplary embodiment of finding suitable narrow UE RX beams corresponding to the first and second suitable TX beams. In step 602, the TRP 505 sets up two aperiodic UE RX beam training procedures (i.e. sets up two P3 sweeps) and sends an indication to the UE 510 that the two UE RX beam training procedures should be treated as one aggregated UE RX beam training procedure. The indication triggers the aggregated UE RX beam training procedure. This step 602 is also referred to as the TRP 505 triggering a joint P3 sweep.

Figure 7:
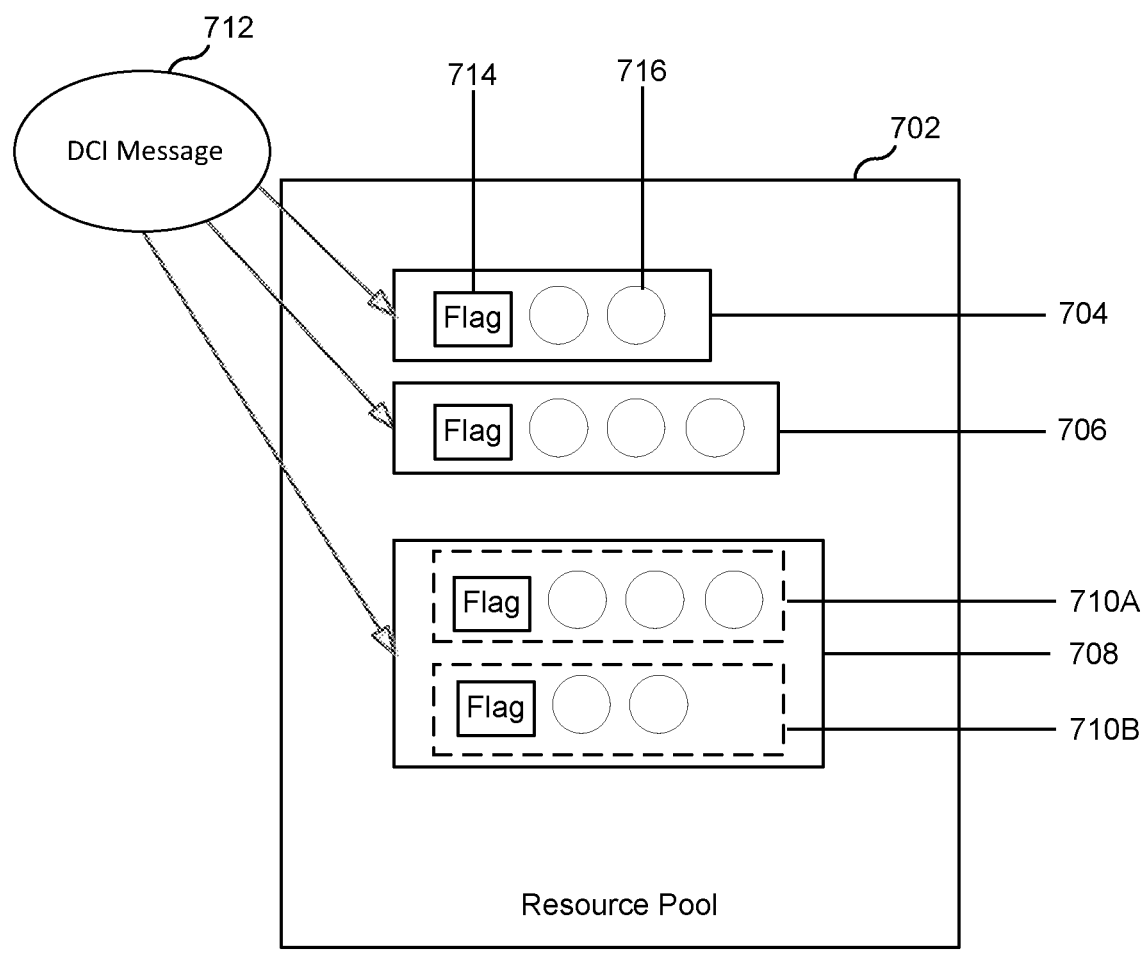
FIG. 7 illustrates a DCI message in relation to one or more CSI-RS resource sets according to one embodiment.

In some embodiments, the indication may be signaled explicitly by transmitting one or more downlink control information (DCI) messages. In such embodiments, the TRP 505 may transmit a DCI message 712 including one or more indexes to one or more resource sets comprised in a resource pool 702 of the network, as shown in FIG. 7. Each of the one or more resource sets in the resource pool 702 comprises information identifying one or more CSI-RS resources 716 and a repetition flag 714. The repetition flag may be set to "on" or "off."

In an embodiment, the DCI message 712 may include a first index to a first CSI-RS resource set 704 and a second index to a second CSI-RS resource set 706. The first CSI-RS resource set 704 may comprise information identifying one or more CSI-RS resources for the first UE RX beam training procedure and a first repetition flag. The second CSI-RS resource set 706 may comprise information identifying one or more CSI-RS resources for the second UE RX beam training procedure and a second repetition flag. In such embodiments, the first and second repetition flag in the first and second CSI-RS resource sets 704, 706 are set to "on," thereby explicitly indicating (e.g., triggering) the initiation of the aggregated UE RX beam training procedure by the UE 510.

In another embodiment, the DCI 712 may include an index to a CSI-RS resource set 708 comprising a first CSI-RS resource group 710A and a second CSI-RS resource group 710B. The first CSI-RS resource group 710A may comprise information identifying one or more CSI-RS resources for the first UE RX beam training procedure and a first repetition flag. The second CSI-RS resource group 710B may comprise one or more CSI-RS resources for the second UE RX beam training procedure and a second repetition flag. In such embodiments, the first and second repetition flag in the first and second CSI-RS resource groups 710A-B are set to "on," thereby explicitly indicating (e.g., triggering) the initiation of the aggregated UE RX beam training procedure by the UE 510. In some embodiments, the CSI-RS resource set 708 may comprise the first CSI-RS resource group 710A, the second CSI-RS resource group 710B, and one repetition flag for the first CSI-RS resource group 710A and the second CSI RS group 710B. In such embodiments, the one repetition flag may be set to "on," thereby explicitly indicating (e.g., triggering) the initiation of the aggregated UE RX beam training procedure by the UE 510.

Figure 8:
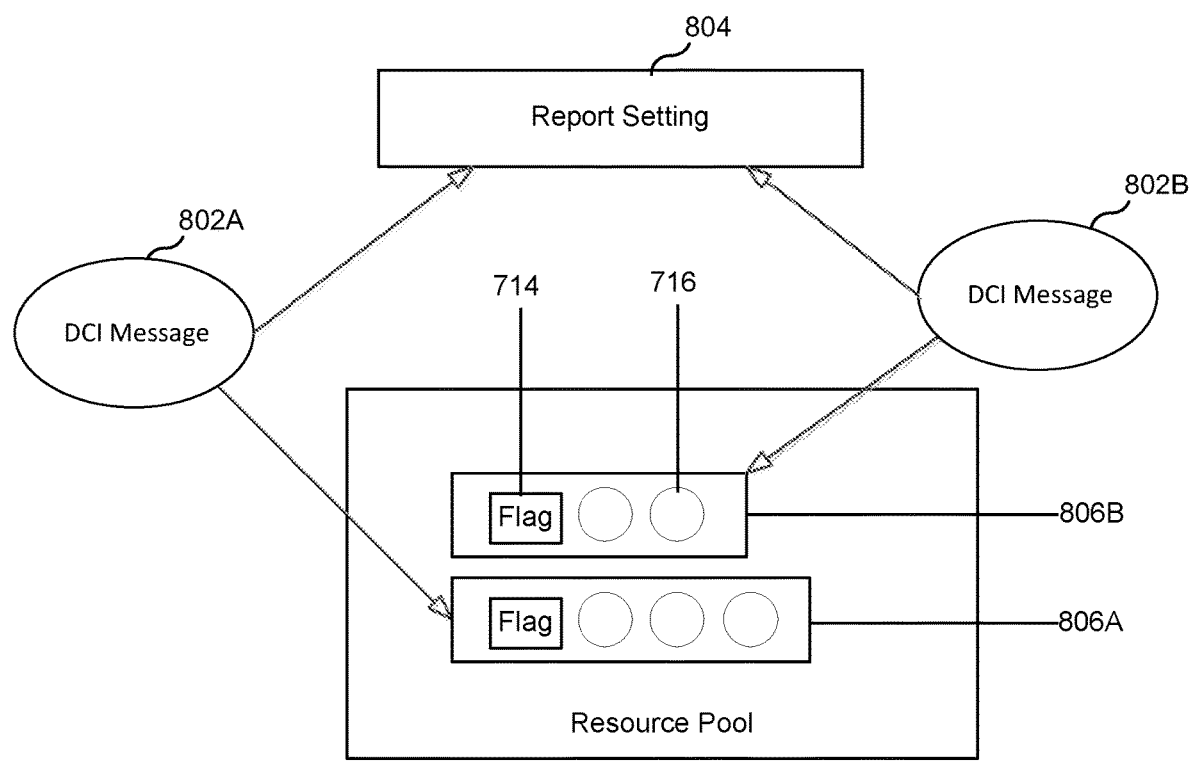
FIG. 8 illustrates two DCI messages in relation to one or more CSI-RS resource sets and a report setting according to one embodiment.

In yet another embodiment, a first DCI message 802A and a second DCI message 802B may be transmitted by the TRP 505 to trigger the aggregated UE RX beam training procedure, as shown in FIG. 8. In such embodiments, the first DCI message 802A may include a first index to a first CSI-RS resource set 806A and an index to a report setting 804 (e.g., CSI-RS report setting). The second DCI message 802B may include a second index to a second CSI-RS resource set 806B and the index to the report setting 804. The first CSI-RS resource set 806A may comprise information identifying one or more CSI-RS resources for the first UE RX beam training procedure and a first repetition flag. The second CSI-RS resource set 806B may comprise information identifying one or more CSI-RS resources for the second UE RX beam training procedure and a second repetition flag. In such embodiments, the first and second repetition flag in the first and second CSI-RS resource sets 806A-B are set to "on," thereby explicitly indicating the initiation of the aggregated UE RX beam training procedure by the UE 510. In some embodiments, the report setting 804 may inform the UE to report any determined PMI, MCS, and rank based on the aggregated UE RX beam training procedure to be reported in one CSI report. In some embodiments, the report setting 804 may instruct the UE to report channel state information (CSI) and reference signal received power (RSRP) report, among others.

In some embodiments, the indication may be indicated implicitly. For example, the UE 510 may be configured to initiate an aggregated UE RX beam training procedure for multiple UE RX training procedures if the CSI-RS resources for each of the UE RX training procedures are transmitted simultaneously, i.e. when the CSI-RS resources are scheduled in the same OFDM symbols.

Referring back to FIG. 6, in step 604 the TRP 505 then transmits the CSI resources corresponding to the two UE RX beam training procedures through bursts of the CSI-RS resources. In step 606, the UE 510 sweeps through different UE RX beam settings in the aggregated UE RX beam training procedure, and determines the best UE RX beam setting for the aggregation of CSI-RS ports corresponding to all the UE RX beam training procedures. The UE 510 evaluates the different UE RX beam setting performance for the different UE RX beam settings in determining the best UE RX beam setting. For example, the UE 510 may evaluate the different UE RX beam settings based on a highest estimated throughput or the RSRP over all of the aggregated CSI-RS ports. In some embodiments, the UE 510 may perform the aggregated UE RX beam training procedure by obtaining measurements of the bursts of the CSI-RS resources and determine an aggregated channel estimation based on the obtained measurements. In step 608, the UE 510 determines a PMI, rank, and MCS for the aggregated CSI-RS ports corresponding to the UE RX beam training procedures for the determined best UE beam setting. In some embodiments, the UE 510 determines the PMI, rank, and MCS based on the determined aggregated channel estimation. In step 608, the UE 510 may transmit, to the TRP 505, a CSI report comprising the determined PMI, rank, and MCS, among others. In some embodiments, the determined PMI, rank, and MCS is transmitted in one CSI report.

Figure 9:
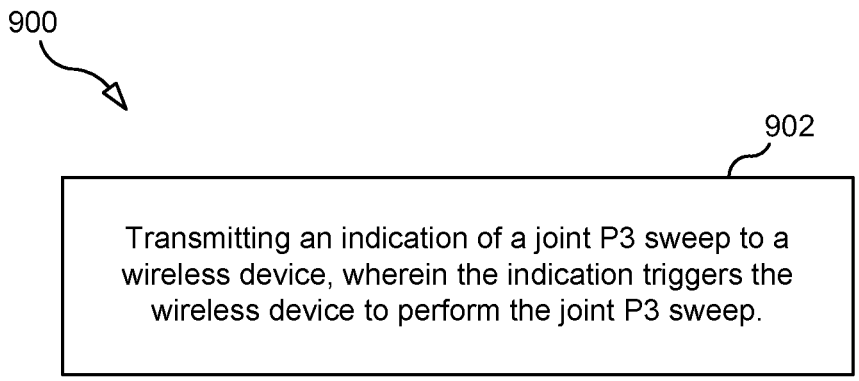
FIG. 9 illustrates a flow chart illustrating a process according to one embodiment.

FIG. 9 is a flow chart illustrating a process 900, according to some embodiments, that is performed by the TRP.

Process 900 may begin with step 902 in which the TRP (e.g., base station) transmits an indication of a joint P3 sweep to a UE (e.g., wireless device), wherein the indication triggers the UE to perform the joint P3 sweep.

In some embodiments, the indication may be a downlink control information (DCI) message comprising a first index to a first channel state information reference signal (CSI-RS) resource set and a second index to a second CSI-RS resource set. In such embodiments, the first CSI-RS resource set relates to a first P3 sweep and the second CSI-RS resource set relates to a second P3 sweep. Each of the first and second CSI-RS resource set may comprise information identifying one or more CSI-RS resources and a repetition indicator. In some embodiments, the repetition indicator may be a repetition flag configured to be set "on" or "off." In some embodiments, the DCI message may further comprise a report index to a CSI-RS report setting. The CSI-RS report setting may be configured to instruct the UE what to report regarding the joint P3 sweep. In some embodiments, the CSI-RS report setting may instruct the UE to report channel state information (CSI) and reference signal received power (RSRP) report, among others.

In some embodiments, the indication may be a downlink control information (DCI) message comprising an index to a channel state information reference signal (CSI-RS) resource set. In such embodiments, the CSI-RS resource set comprises a first CSI-RS resource group which relates to a first P3 sweep and a second CSI-RS resource group which relates to a second P3 sweep. In some embodiments, each of the first and second CSI-RS resource group may comprise information identifying one or more CSI-RS resources and a repetition indicator. In some embodiments, the CSI-RS resource set may comprise one repetition indicator for the first and second CSI-RS resource group, where each of the first and second CSI-RS resource group comprises information identifying one or more CSI-RS resources. In some embodiments, the repetition indicator may be a repetition flag configured to be set "on" or "off."

In some embodiments, the indication may be a first downlink control information (DCI) message relating to a first P3 sweep and a second DCI message relating to a second P3 sweep. In such embodiments, the first DCI message comprises a first index to a first channel state information reference signal (CSI-RS) resource set and a report index to a CSI-RS report setting. The second DCI message comprises a second index to a second CSI-RS resource set and the report index to the CSI-RS report setting. In some embodiments, each of the first and second CSI-RS resource set may comprise information identifying one or more CSI-RS resources and a repetition indicator. In some embodiments, the repetition indicator may be a repetition flag configured to be set "on" or "off."

Figure 10:
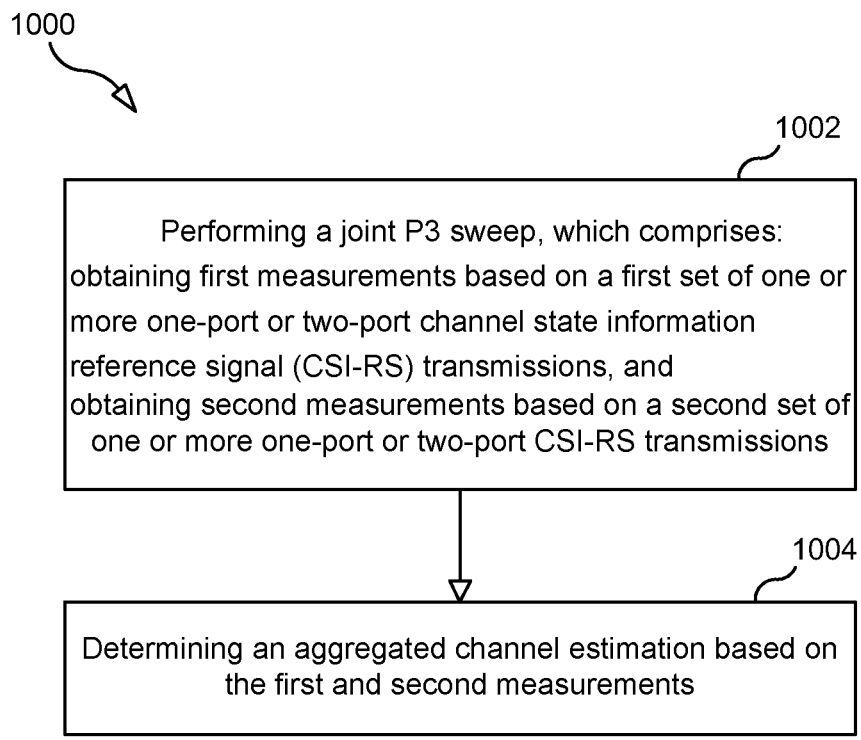
FIG. 10 illustrates a flow chart illustrating a process according to one embodiment.

FIG. 10 is a flow chart illustrating a process 1000, according to some embodiments, that is performed by the UE.

Process 1000 may begin with step 1002 in which the UE (e.g., wireless device) performs a joint P3 sweep, which comprises: obtaining first measurements based on a first set of one or more one-port or two-port channel state information reference signal (CSI-RS) transmissions, and obtaining second measurements based on a second set of one or more one-port or two-port CSI-RS transmissions. In some embodiments, the wireless device may receive a trigger to perform the joint P3 sweep.

In step 1004, the UE determines an aggregated channel estimation based on the first and second measurements. In some embodiments, the aggregated channel estimation is a four-port channel estimation.

In some embodiments, the process 1000 may have an additional step 1006 where the UE determines at least one or more of a precoding matrix indicator (PMI), a modulation and coding scheme (MCS), and a rank based on the determined aggregated channel estimation. In some embodiments, the UE may report the determined at least one or more of the PMI, the MCS, and the rank to a TRP (e.g., base station). In some embodiments, the determined at least one or more of the PMI, the MCS, and the rank is reported to the TRP in one channel state information (CSI) report.

Figure 11:
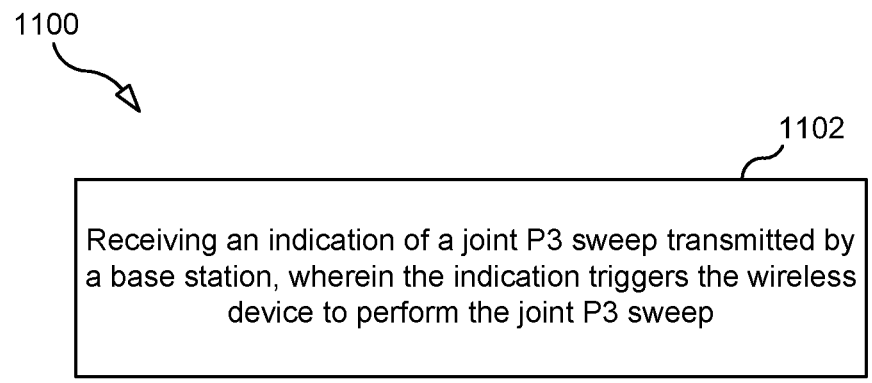
FIG. 11 illustrates a flow chart illustrating a process according to one embodiment.

FIG. 11 is a flow chart illustrating a process 1100, according to some embodiments, that is performed by the UE.

Process 1100 may begin with step 1102 in which the UE (e.g., wireless device) receives an indication of a joint P3 sweep transmitted by a TRP (e.g., base station), wherein the indication triggers the wireless device to perform the joint P3 sweep.

In some embodiments, the indication may be a downlink control information (DCI) message comprising a first index to a first channel state information reference signal (CSI-RS) resource set and a second index to a second CSI-RS resource set. In such embodiments, the first CSI-RS resource set relates to a first P3 sweep and the second CSI-RS resource set relates to a second P3 sweep. Each of the first and second CSI-RS resource set may comprise information identifying one or more CSI-RS resources and a repetition indicator. In some embodiments, the repetition indicator may be a repetition flag configured to be set "on" or "off." In some embodiments, the DCI message may further comprise a report index to a CSI-RS report setting. The CSI-RS report setting may be configured to instruct the UE what to report regarding the joint P3 sweep. In some embodiments, the CSI-RS report setting may instruct the UE to report channel state information (CSI) and reference signal received power (RSRP) report, among others.

In some embodiments, the indication may be a downlink control information (DCI) message comprising an index to a channel state information reference signal (CSI-RS) resource set. In such embodiments, the CSI-RS resource set comprises a first CSI-RS resource group which relates to a first P3 sweep and a second CSI-RS resource group which relates to a second P3 sweep. In some embodiments, each of the first and second CSI-RS resource group may comprise information identifying one or more CSI-RS resources and a repetition indicator. In some embodiments, the CSI-RS resource set may comprise one repetition indicator for the first and second CSI-RS resource group, where each of the first and second CSI-RS resource group comprises information identifying one or more CSI-RS resources. In some embodiments, the repetition indicator may be a repetition flag configured to be set "on" or "off."

In some embodiments, the indication may be a first downlink control information (DCI) message relating to a first P3 sweep and a second DCI message relating to a second P3 sweep. In such embodiments, the first DCI message comprises a first index to a first channel state information reference signal (CSI-RS) resource set and a report index to a CSI-RS report setting. The second DCI message comprises a second index to a second CSI-RS resource set and the report index to the CSI-RS report setting. In some embodiments, each of the first and second CSI-RS resource set may comprise information identifying one or more CSI-RS resources and a repetition indicator. In some embodiments, the repetition indicator may be a repetition flag configured to be set "on" or "off."

Figure 12:
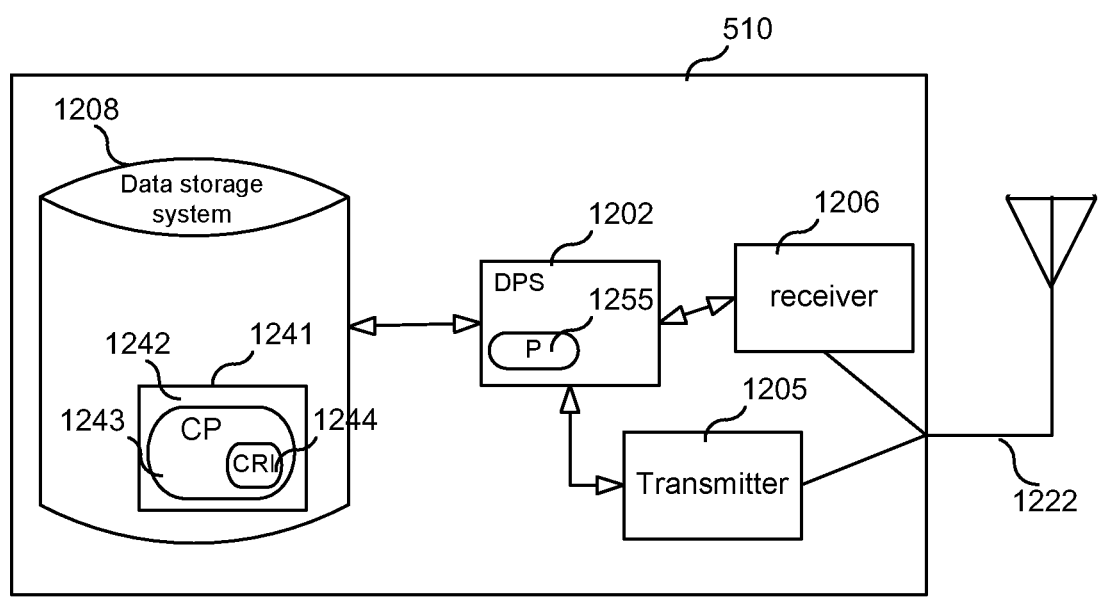
FIG. 12 is a block diagram of a UE according to some embodiments.

FIG. 12 is a block diagram of UE 510 according to some embodiments. As shown in FIG. 12, the UE may comprise: a data processing system (DPS) 1202, which may include one or more processors 1255 (e.g., a general purpose microprocessor and/or one or more other processors, such as an application specific integrated circuit (ASIC), field-programmable gate arrays (FPGAs), and the like); a radio transmitter 1205 and a radio receiver 1206 coupled to an antenna 1222 for use in wirelessly communicating with a radio access network (RAN) node (e.g., a TRP); and local storage unit (a.k.a., "data storage system") 1212, which may include one or more non-volatile storage devices and/or one or more volatile storage devices (e.g., random access memory (RAM)). In embodiments where the UE includes a general purpose microprocessor, a computer program product (CPP) 1241 may be provided. CPP 1241 includes a computer readable medium (CRM) 1242 storing a computer program (CP) 1243 comprising computer readable instructions (CRI) 1244. CRM 1242 may be a non-transitory computer readable medium, such as, but not limited, to magnetic media (e.g., a hard disk), optical media (e.g., a DVD), memory devices (e.g., random access memory, flash memory, etc.), and the like. In some embodiments, the CRI 1244 of computer program 1243 is configured such that when executed by data processing system 1202, the CRI causes the UE to perform steps described above (e.g., steps described above with reference to the flow charts). In other embodiments, the UE may be configured to perform steps described herein without the need for code. That is, for example, data processing system 1202 may consist merely of one or more ASICs. Hence, the features of the embodiments described herein may be implemented in hardware and/or software.

Figure 13:
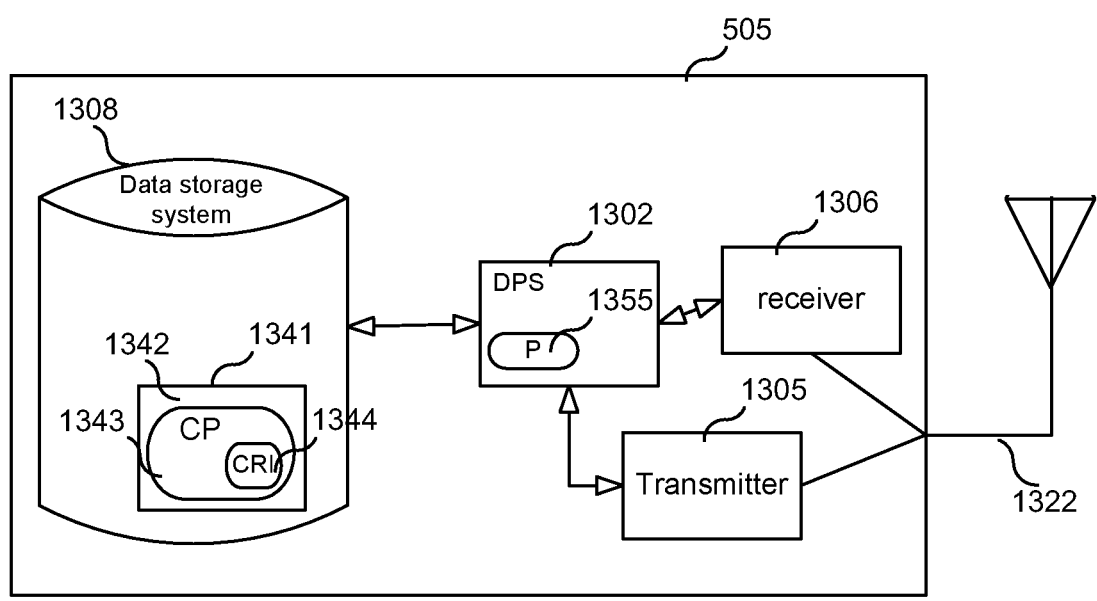
FIG. 13 is a block diagram of TRP according to some embodiments.

FIG. 13 is a block diagram of TRP 505 according to some embodiments. As shown in FIG. 13, the TRP may comprise: a data processing system (DPS) 1302, which may include one or more processors 1355 (e.g., a general purpose microprocessor and/or one or more other processors, such as an application specific integrated circuit (ASIC), field-programmable gate arrays (FPGAs), and the like); a radio transmitter 1305 and a radio receiver 1306 coupled to an antenna 1322 for use in wirelessly communicating with a UE; and local storage unit (a.k.a., "data storage system") 1312, which may include one or more non-volatile storage devices and/or one or more volatile storage devices (e.g., random access memory (RAM)). In embodiments where the TRP includes a general purpose microprocessor, a computer program product (CPP) 1341 may be provided. CPP 1341 includes a computer readable medium (CRM) 1342 storing a computer program (CP) 1343 comprising computer readable instructions (CRI) 1344. CRM 1342 may be a non-transitory computer readable medium, such as, but not limited, to magnetic media (e.g., a hard disk), optical media (e.g., a DVD), memory devices (e.g., random access memory, flash memory, etc.), and the like. In some embodiments, the CRI 1344 of computer program 1343 is configured such that when executed by data processing system 1302, the CRI causes the TRP to perform steps described above (e.g., steps described above with reference to the flow charts). In other embodiments, the TRP may be configured to perform steps described herein without the need for code. That is, for example, data processing system 1302 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a base station comprising a first antenna array and a second antenna array that is separate from the first antenna array, comprising:

using the first antenna array but not the second antenna array, performing a first beam management procedure to select a first suitable transmit (TX) beam for use in communicating with a wireless device via the first antenna array;

as a result of performing the first beam management procedure using the first antenna array, selecting a first TX beam for use in communicating with the wireless device via the first antenna array;

using the second antenna array but not the first antenna array, performing a second beam management procedure to select a second suitable TX beam for use in communicating with the wireless device via the second antenna array;

as a result of performing the second beam management procedure using the second antenna array, selecting a second TX beam for use in communicating with the wireless device via the second antenna array;

after performing the first and second beam management procedures, transmitting an indication of a joint P3 sweep to the wireless device, wherein the indication triggers the wireless device to perform the joint P3 sweep, and wherein the joint P3 sweep comprises a first P3 sweep and a second P3 sweep;

enabling the wireless device to perform the first P3 sweep, wherein enabling the wireless device to perform the first P3 sweep comprises: i) using the first antenna array and the first TX beam to transmit a reference signal during a first period of time and ii) using the first antenna array and the first TX beam to transmit the reference signal during a second period of time that is after the first period of time;

enabling the wireless device to perform the second P3 sweep, wherein enabling the wireless device to perform the second P3 sweep comprises: i) using the second antenna array and the second TX beam to transmit the reference signal during a third period of time and ii) using the second antenna array and the second TX beam to transmit the reference signal during a fourth period of time that is after the third period of time; and receiving a single channel state information (CSI) report transmitted by the wireless device, wherein the single CSI report corresponds to both the first and second P3 sweeps.

2. The method of claim 1, wherein the indication comprises:
a downlink control information (DCI) message comprising a first index to a first channel state information reference signal (CSI-RS) resource set and a second index to a second CSI-RS resource set,
wherein the first CSI-RS resource set relates to the first P3 sweep and the second CSI-RS resource set relates to the second P3 sweep.

3. The method of claim 2, wherein the DCI message further comprises a report index to a CSI-RS report setting.

4. The method of claim 2, wherein each of the first and second CSI-RS resource set comprises information identifying one or more CSI-RS resources and a repetition indicator.

5. The method of claim 1, wherein the indication comprises:
a downlink control information (DCI) message comprising an index to a channel state information reference signal (CSI-RS) resource set, wherein the CSI-RS resource set comprises a first CSI-RS resource group and a second CSI-RS resource group, and
wherein the first CSI-RS resource group relates to the first P3 sweep and the second CSI-RS resource group relates to the second P3 sweep.

6. The method of claim 5, wherein each of the first and second CSI-RS resource group comprises information identifying one or more CSI-RS resources and a repetition indicator.

7. The method of claim 5, wherein the CSI-RS resource set further comprises one repetition indicator for the first and second CSI-RS resource group, and
wherein each of the first and second CSI-RS resource group comprises information identifying one or more CSI-RS resources.

8. The method of claim 1, wherein the indication comprises:
a first downlink control information (DCI) message comprising a first index to a first channel state information reference signal (CSI-RS) resource set and a report index to a CSI-RS report setting; and
a second DCI message comprising a second index to a second CSI-RS resource set and the report index to the CSI-RS report setting,
wherein the first DCI message relates to the first P3 sweep and the second DCI message related to the second P3 sweep.

9. The method of claim 8, wherein each of the first and second CSI-RS resource set comprises information identifying one or more CSI-RS resources and a repetition indicator.

10. The method of claim 1,
wherein
the CSI report comprises a precoding matrix indicator (PMI) corresponding to a four-port codebook.

11. A method implemented in a wireless device, comprising:
receiving an indication of a joint P3 sweep transmitted by a base station having a first antenna array and a second antenna array that is separate from the first antenna array, wherein the indication triggers the wireless device to perform the joint P3 sweep, and wherein the joint P3 sweep comprises a first P3 sweep and a second P3 sweep;
performing the joint P3 sweep, which comprises:
obtaining a first plurality of channel state information reference signal (CSI-RS) measurements based on a first plurality of CSI-RS transmissions transmitted by the base station using a first TX beam and the first antenna array of the base station, and
obtaining second plurality of CSI-RS measurements based on a second plurality of CSI-RS transmissions transmitted by the base station using a second TX beam and the second antenna array of the base station; and
determining an aggregated channel estimation based on: i) the first plurality of CSI-RS measurements based on the first plurality of CSI-RS transmissions transmitted by the base station using the first TX beam and the first antenna array of the base station and ii) the second plurality of CSI-RS measurements based on the second plurality of CSI-RS transmissions transmitted by the base station using the second TX beam and the second antenna array of the base station.

12. The method of claim 11, further comprising:
determining at least one or more of a precoding matrix indicator (PMI), a modulation and coding scheme (MCS), and a rank based on the determined aggregated channel estimation.

13. The method of claim 12, further comprising:
reporting the determined at least one or more of the PMI, the MCS, and the rank to a base station.

14. The method of claim 13, wherein the determined at least one or more of the PMI, the MCS, and the rank is reported to the base station in the single CSI report.

15. The method of claim 11, wherein the aggregated channel estimation is a four-port channel estimation.

16. A method implemented in a wireless device, comprising:
receiving an indication of a joint P3 sweep transmitted by a base station comprising a first antenna array and a second antenna array that is separate from the first antenna array, wherein the indication triggers the wireless device to perform the joint P3 sweep, and wherein the joint P3 sweep comprises a first P3 sweep and a second P3 sweep;

performing the first P3 sweep, wherein performing the first P3 sweep comprises: i) during a first period of time, using a first receive (RX) beam to receive a reference signal transmitted by the base station using the first antenna array and a first TX beam and ii) during a second period of time that follows the first period of time, using a second RX beam to receive a reference signal transmitted by the base station using the first antenna array and the first TX beam;

performing the second P3 sweep, wherein performing the second P3 sweep comprises: i) during a third period of time, using the first RX beam to receive a reference signal transmitted by the base station using the second antenna array and a second TX beam and ii) during a fourth period of time that follows the third period of time, using the second RX beam to receive a reference signal transmitted by the base station using the second antenna array and the second TX beam; and transmitting to the base station a single channel state information (CSI) report that corresponds to both the first and second P3 sweeps.

17. The method of claim 16, wherein the indication comprises:

a downlink control information (DCI) message comprising a first index to a first channel state information reference signal (CSI-RS) resource set and a second index to a second CSI-RS resource set, wherein the first CSI-RS resource set relates to the first P3 sweep and the second CSI-RS resource set relates to the second P3 sweep.

18. The method of claim 17, wherein the DCI message further comprises a report index to a CSI-RS report setting.

19. The method of claim 17, wherein each of the first and second CSI-RS resource set comprises information identifying one or more CSI-RS resources and a repetition indicator.

20. The method of claim 16, wherein the indication comprises:

a downlink control information (DCI) message comprising an index to a channel state information reference signal (CSI-RS) resource set, wherein the CSI-RS resource set comprises a first CSI-RS resource group and a second CSI-RS resource group, and wherein the first CSI-RS resource group relates to the first P3 sweep and the second CSI-RS resource group relates to the second P3 sweep.

21. The method of claim 20, wherein each of the first and second CSI-RS resource group comprises information identifying one or more CSI-RS resources and a repetition indicator.

22. The method of claim 20, wherein the CSI-RS resource set further comprises one repetition indicator for the first and second CSI-RS resource group, and wherein each of the first and second CSI-RS resource group comprises information identifying one or more CSI-RS resources.

23. The method of claim 16, wherein the indication comprises:

a first downlink control information (DCI) message comprising a first index to a first channel state information reference signal (CSI-RS) resource set and a report index to a CSI-RS report setting; and a second DCI message comprising a second index to a second CSI-RS resource set and the report index to the CSI-RS report setting, wherein the first DCI message relates to the first P3 sweep and the second DCI message related to the second P3 sweep.

24. The method of 23, wherein each of the first and second CSI-RS resource set comprises information identifying one or more CSI-RS resources and a repetition indicator.

* * * * *